United States Patent [19]
Large

[11] Patent Number: 6,043,936
[45] Date of Patent: Mar. 28, 2000

[54] DIFFRACTIVE STRUCTURE ON INCLINED FACETS

[75] Inventor: Timothy Andrew Large, Cambridge, United Kingdom

[73] Assignee: De La Rue International Limited, London, United Kingdom

[21] Appl. No.: 09/077,460

[22] PCT Filed: Dec. 6, 1996

[86] PCT No.: PCT/GB96/03016

§ 371 Date: Jun. 9, 1998

§ 102(e) Date: Jun. 9, 1998

[87] PCT Pub. No.: WO97/21121

PCT Pub. Date: Jun. 12, 1997

[30] Foreign Application Priority Data

Dec. 6, 1995 [GB] United Kingdom .................. 9524862

[51] Int. Cl.[7] .............................. G02B 5/18; B29D 11/00
[52] U.S. Cl. ......................... 359/572; 359/569; 359/900; 264/1.31; 264/2.5
[58] Field of Search ..................... 359/566, 569, 359/570, 567, 8, 529, 530, 900, 572, 571; 264/1.31, 2.5

[56] References Cited

U.S. PATENT DOCUMENTS

| | | |
|---|---|---|
| 4,496,216 | 1/1985 | Cowan . |
| 4,537,504 | 8/1985 | Baltes et al. ............................. 356/71 |
| 4,576,850 | 3/1986 | Martens .................................. 428/156 |
| 5,161,057 | 11/1992 | Johnson ................................. 359/566 |
| 5,299,061 | 3/1994 | Wakatake ............................... 359/530 |
| 5,682,265 | 10/1997 | Farn et al. .............................. 359/571 |
| 5,905,571 | 5/1999 | Butler et al. ........................... 356/328 |

FOREIGN PATENT DOCUMENTS

| | | |
|---|---|---|
| 0240261 | 10/1987 | European Pat. Off. ............... 359/566 |
| 303 355 | 5/1989 | European Pat. Off. ......... G03H 1/04 |
| 715 189 | 6/1996 | European Pat. Off. .......... G02B 5/18 |
| 42 25 007 | 2/1994 | Germany ........................ F21S 11/00 |
| 404356001 | 12/1992 | Japan ..................................... 359/566 |

OTHER PUBLICATIONS

E. G. Loewen, "Diffraction Gratings for Spectroscopy", Journal of Physics E Scientific Instruments vo. 3, pp. 953–961, Dec. 1970.

T. Shiono et al., "Computer–Controlled Electron–Beam Writing System for Thin Film Micro–Optics", Journal of Vacuum Science & Technology: Part B, vol. 5, No. 1, pp. 33–36, Feb. 1987.

Klumpp et al., "Anisotropic Etching for Optical Gratings", Sensors and Actuators A, vol. A51, pp. 77–80, Oct. 1995.

*Primary Examiner*—Cassandra Spyrou
*Assistant Examiner*—John Juba, Jr.
*Attorney, Agent, or Firm*—Oliff & Berridge, PLC

[57] ABSTRACT

A diffractive structure (100) has a substantially planar substrate (1). A set of facets (2) is formed in or on said substrate (1), the plane or planes in which the facets (2) lie being arranged at a non-zero angle to the plane of the substrate (1). Each facet (2) has a diffraction grating (5) formed thereon. The diffractive structure (100) will produce color over a wide range of viewing and illumination angles.

15 Claims, 11 Drawing Sheets

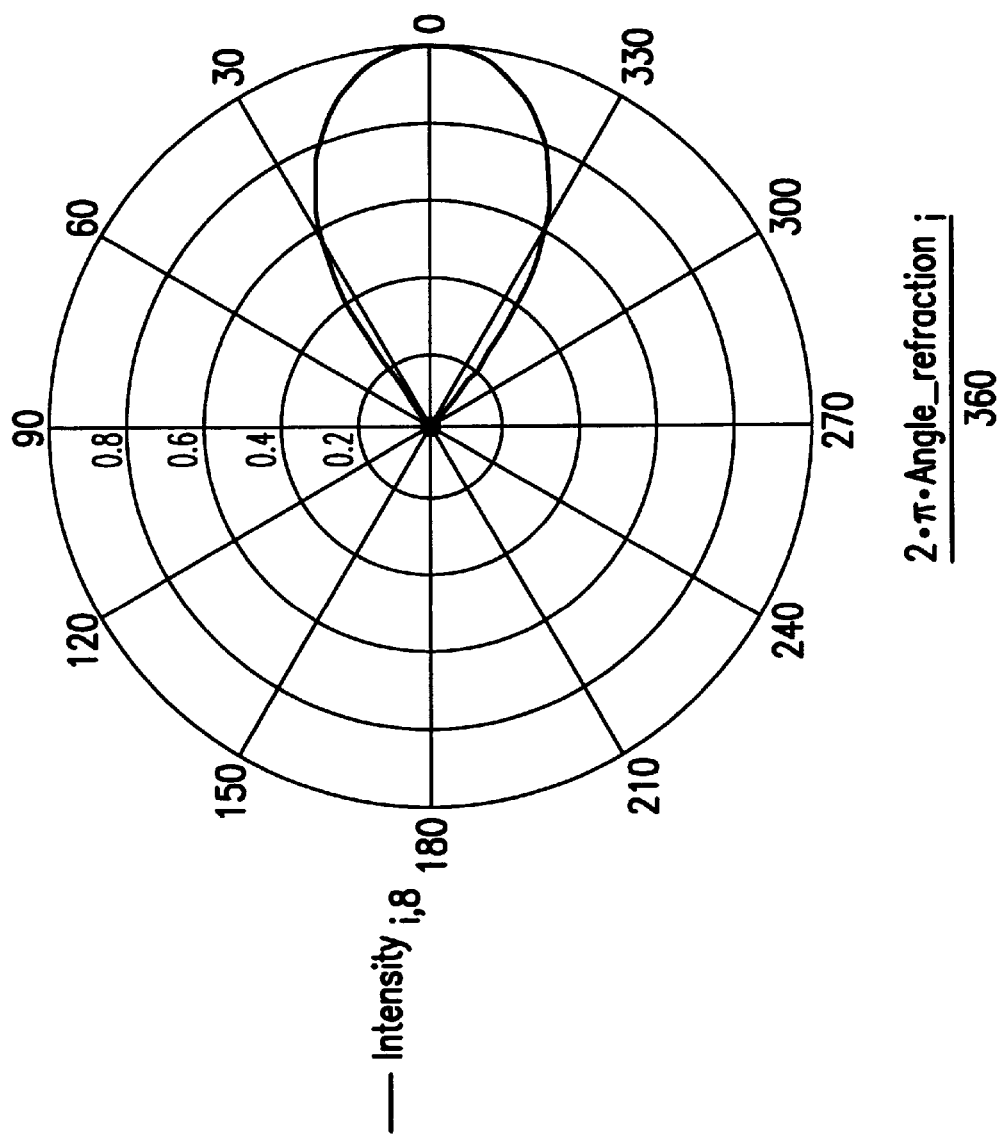
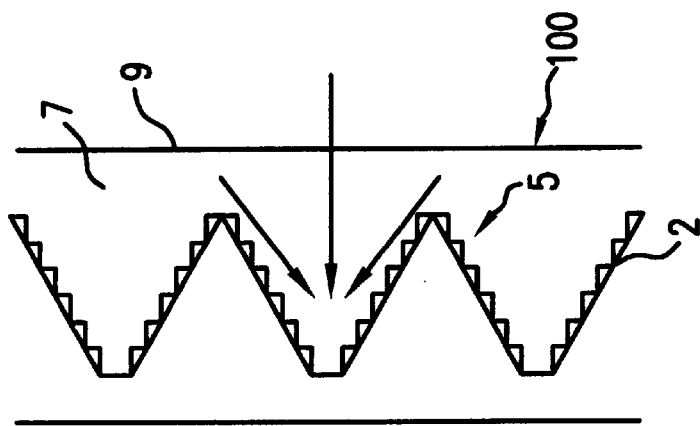
FIG.7

DIFFRACTIVE STRUCTURE ON INCLINED FACETS

The present invention relates to a diffractive structure.

In many applications, it is desirable to have a diffractive structure having reflective properties which do not depend upon specific limited illumination and viewing angles to produce colour.

For example, in security films, security holograms conventionally consist of a thermoformed plastic layer having a reflective aluminium film deposited on the thermoformed layer. The hologram is formed by surface relief. The absence of any absorption within the structure, and the angular sensitivity of a holographic image, means that under diffuse illumination (such as dull daylight or rooms lit by many lamps), the hologram cannot be seen or can only be seen from within a very narrow range of viewing angles.

As a further example, diffractive pigments, such as those disclosed in JP-A-63/172779, would benefit from the use of a diffractive structure which does not appear "washed out" and lacking in colour under normal outdoor viewing conditions. JP-A-63/172779 discloses a pigment which consists of a multiplicity of particles each of which carries on its surface grooves that form a diffraction grating. Since the gratings on the particles suffer strong angular dependence and have no intrinsic absorption, the diffractive colour effect will only be visible under strong, highly directional, illumination such as direct sunshine or spotlight illumination. Under diffuse illumination (for example on an overcast day), the pigment as disclosed in JP-A-63/172779 would appear grey.

In EP-A-0303355, there is disclosed a hologram/diffractive medium having a plurality of periodically-spaced stepped structures each of which is distributed depthwise in the medium.

An object of the present invention is to provide a diffractive structure that will produce colour over a wide range of viewing and illumination angles.

According to a first aspect of the present invention, there is provided a diffractive structure, the structure comprising: a substantially planar substrate; and, a set of facets formed in or on said substrate, the plane or planes in which the facets lie being arranged at a non-zero angle to the plane of the substrate; the facets having a diffraction grating formed thereon having a periodicity of 500 nm or less.

According to a second aspect of the present invention, there is provided a method of manufacturing a diffractive structure as described above, the method comprising the steps of: (A) producing a mould by machining a substrate with repeated passes of a cutting tool, the tool cutting the substrate deeper on each pass of the tool thereby to produce a cut face having machining lines; (B) repeating step (A) to cut a further similar lined face opposite said first face thereby to produce a groove having machining lines on each opposed face; (C) producing a master from said mould; and, (D) producing the diffractive structure from said master, each facet having formed thereon a diffraction grating corresponding to the machining lines of the grooves in the mould.

According to a third aspect of the present invention, there is provided a method of manufacturing a diffractive structure as described above, the method comprising the steps of: (A) producing a mould by anisotropic etching in a silicon substrate to produce a plurality of facets on the mould; (B) coating the mould with a resist layer; (C) writing the fine structure of the diffraction grating directly into the resist with an electron beam or an ion beam; (D) producing a master from said mould; and, (E) producing the diffractive structure from said master.

Preferred features of the present invention are set out in the claims below.

Thus, in an example of the invention, a prismatic surface structure consisting of an array of substantially planar facets is formed in a polymer layer. These facets are typically in the region of 1 micron to 100 microns across and are disposed at a predetermined angle to the plane of the polymer layer. A grooved surface, a ruled array of tetrahedra, square pyramids or a corner cube structure (in which the facets are all squares) are examples of such a prismatic structure. A diffraction structure is formed on the surface of each facet. This smaller structure may be (but is not restricted to) an array of grooves, a crossed grating or a 2-dimensional array of pits and peaks such as the known "motheye" structure. The smaller structure will typically have dimensions ranging from half the facet size down to 0.1 micron. This structure is preferentially metallised such that it is absorbing at some angles of incidence but produces strong diffraction at other angles.

The invention provides a diffractive structure that will produce colour over a wide range of viewing and illumination angles. The diffractive structure can be manufactured in a simple manner using conventional film-forming plastics.

Embodiments of the present invention will now be described by way of example with reference to the accompanying drawings, in which:

FIG. 7 shows the distribution of light rays incident within the polymer layer of the diffractive structure;

Figure 1:
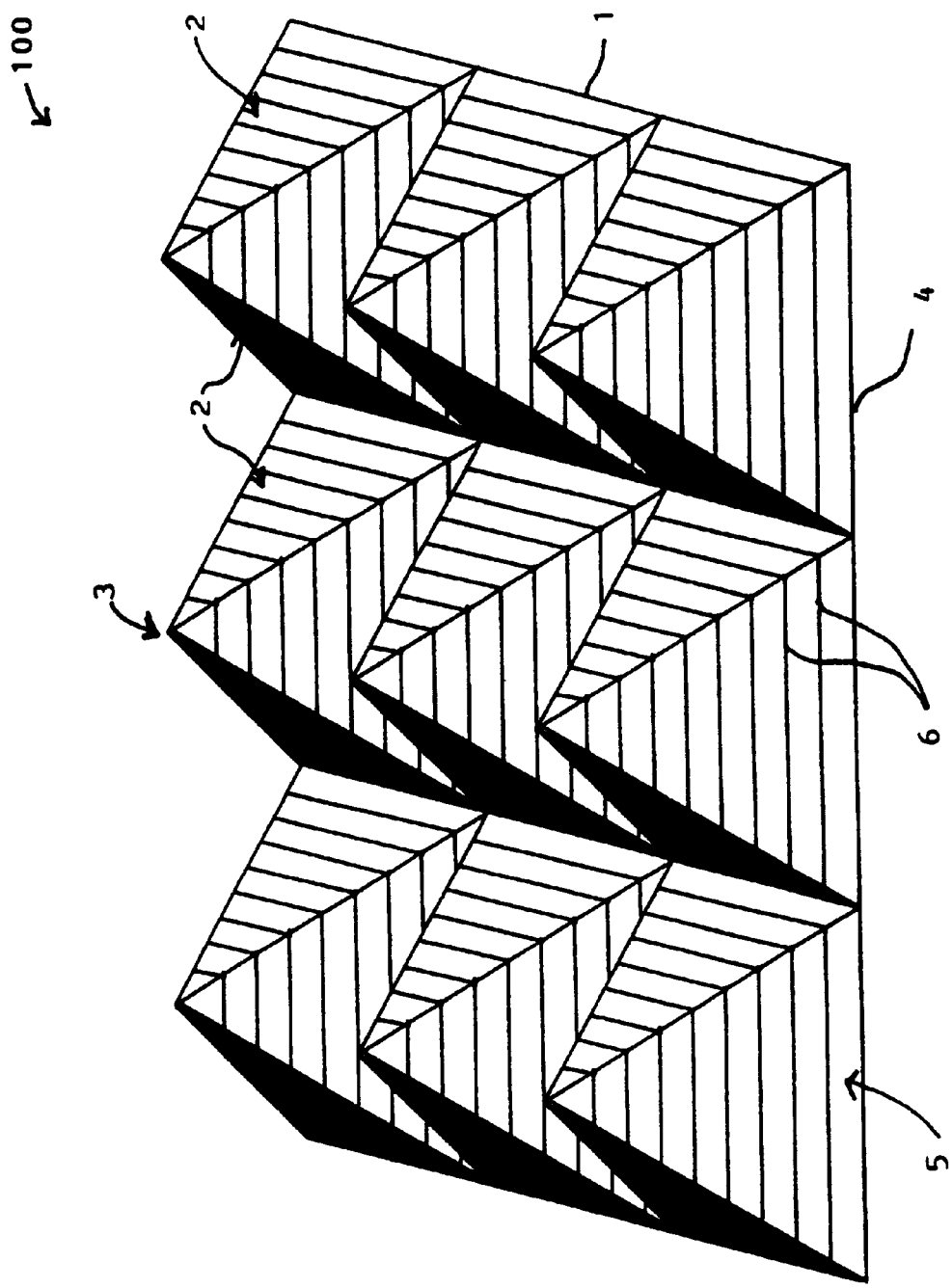
FIG. 1 is a schematic perspective view of an example of a diffractive structure according to the present invention.

In FIG. 1, there is shown a diffractive structure 100 formed by a substrate 1 having an array of facets 2. The facets 2 in this example are provided by the triangular faces 2 of an array of square-base pyramids 3. The pyramids 3 are formed in or on the substrate 1 with their square bases 4 in the same plane so as to provide respective rows of coplanar facets 2. The length of each side of the square bases 4 of the pyramids 3 may be in the range 1 $\mu$m to 100 $\mu$m. Each facet 2 of the pyramids 3 has upon it a diffraction structure such as a ruled diffraction grating 5 formed by grooves or lines 6 having a regular spacing therebetween. The diffraction grating 5 in this example has a period of 300 nm (i.e. the spacing between successive lines 6 is 300 nm) with a height (i.e. the depth of the lines 6) of about 100 nm.

Instead of square-base pyramids 3, the two-dimensional facets 2 can be formed as the faces of triangular-base pyramids, regular tetrahedra (see FIG. 2), a corner cube structure (in which all or substantially all of the facets are squares), or any other polyhedra or structures which provide an array of identical or substantially similar facets which project out of the plane of the substrate 1 at an angle between 0° and 90° to the plane of the substrate 1.

Figure 3:
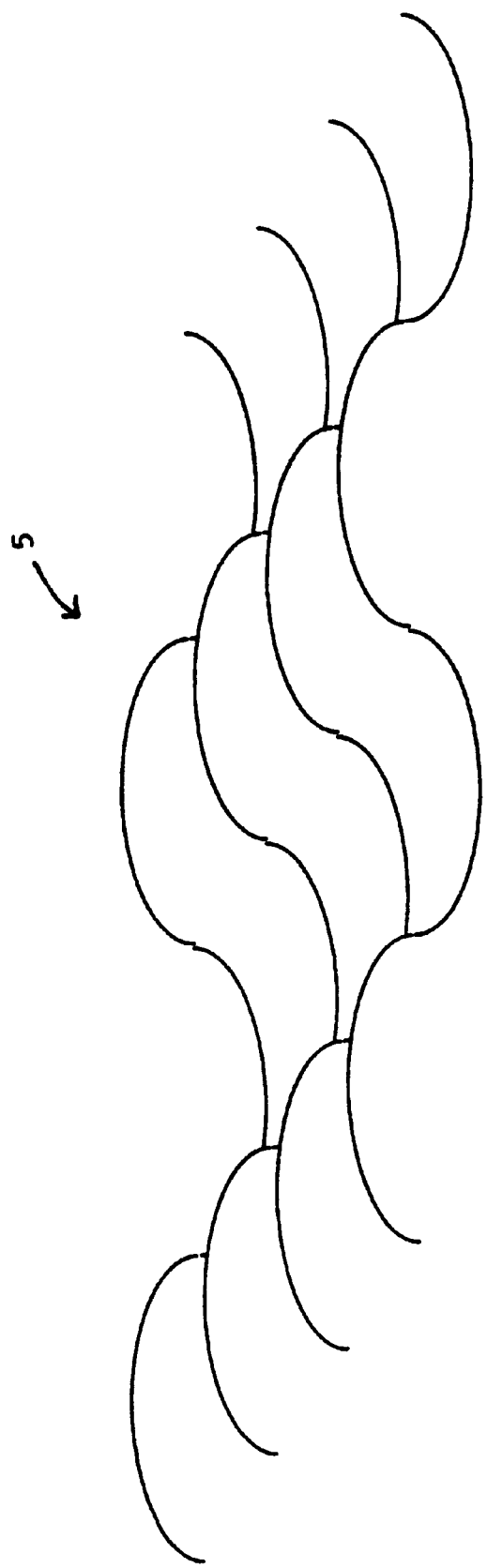
FIG. 3 is a schematic perspective view of a further example of a diffractive structure according to the present invention.
Figure 4:
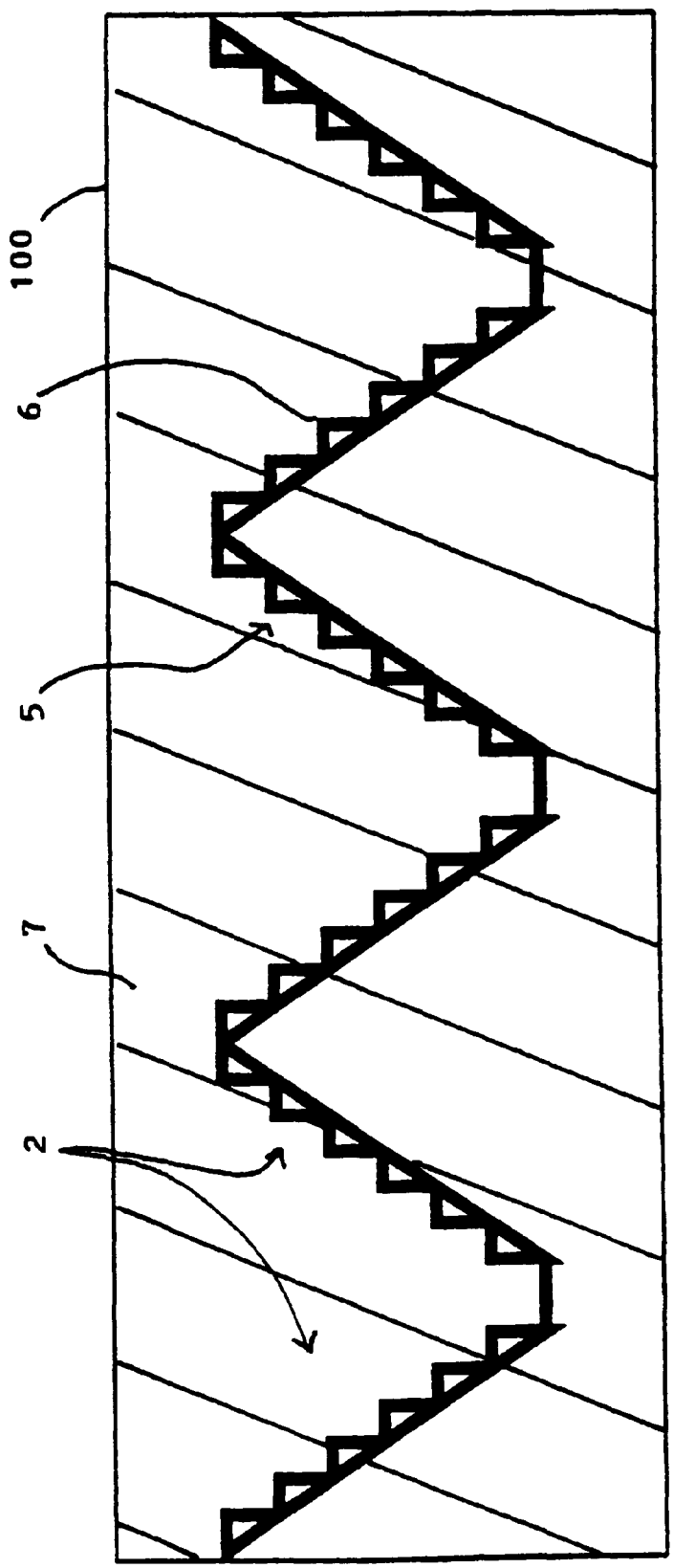
FIG. 4 is a schematic cross-sectional view through a polymer-filled diffractive structure.

Instead of a lined diffraction grating as described above, a 2-dimensional array of pits and peaks such as the known "motheye" structure shown in FIG. 3 may be used as the diffraction grating 5.

Generally speaking, the length of the bases of the facets 2 may be in the range 1 $\mu$m to 100 $\mu$m. The pitch of the diffraction grating 5 formed on a facet 2 may be in the range of 0.1 $\mu$m up to about half the facet size, subject to a maximum of 0.5 $\mu$m.

Because the diffraction grating structure 5 is at an angle to the normal to the substrate 1, sub-wavelength diffraction gratings can be used, thus providing minimum dispersion (i.e. as little colour variation with angle as possible) and cut off of some colours which cannot be reflected because their wavelength is too long.

Furthermore, opposing facets 2 allow short wavelength colours to be trapped because they are diffracted at a higher angle with respect to the facets than the longer wavelengths.

Thus, in the preferred embodiment, there are two mechanisms for colour selection. Dazzling colour effects can be produced even under diffuse lighting and without the use of pigments or dyes.

Two-dimensional facet structures as described, such as the faces of arrays of pyramids or tetrahedra, reduce the sensitivity of the diffractive structure 100 to rotation of the structure 100 both in its own plane and out of its plane that would be seen in a one-dimensional facet structure. Thus, as will be explained further below, the diffractive structure 100 of the present invention will produce colour images under a wide range of lighting conditions and viewing angles.

Using a V-groove (i.e. one-dimensional) structure for the facets 2 means that the colour effect will depend on the angle of rotation of the substrate in its plane though relative insensitivity of the structure to rotation out of its plane is still retained.

An example of a manufacturing process for producing the diffractive structure 100 of the present invention will now be described.

First, a non-ferrous material such as brass or copper is machined using a very sharp diamond tool (not shown) to form a mould which is substantially identical to the diffractive structure 100 to be finally produced. The diamond tip of the tool may have an included angle of 30°. The tool is used to cut a groove to a first depth to provide a cut face having a length equal to the pitch of the diffraction grating to be formed. The tool is then used to cut the groove to a second depth to cut the face to a length which is twice the pitch of the diffraction grating. This process is repeated until the groove has been cut to the desired depth, the tool being moved deeper into the mould material by a distance such that the face which is cut is cut by a length which is equal to the pitch of the diffraction grating to be formed on each successive pass of the tool. As a result of these successively deeper passes of the machining tool, the structure of the diffraction grating composed of the lines is formed from natural machining marks formed during the successive passes of the tool. The groove thus cut will provide a first row of facets in the material. The opposite row of facets 2' and other rows of facets, both parallel and orthogonal to the first row of facets, are then produced by machining further grooves in a similar manner, the further grooves being parallel and perpendicular to the first groove. The included angle of opposed facets may be 90° for example, though this will depend on the geometry and height of the pyramids 3, tetrahedra or other polyhedra which provide the facets 2.

For speed of manufacture, a series of similar cutting tools can be used to cut parallel rows of grooves to provide facets in a gang fashion. Orthogonal rows can be cut by moving the same or another gang of cutting tools perpendicularly to the first row of facets.

An alternative technique for forming the mould is as follows. The mould having the array 3 of square-base pyramids, triangular-base pyramids, regular tetrahedra, corner cube structure, or other polyhedra or structure, is formed by anisotropic etching in silicon. This provides very flat faces to the facets 2. The mould is then coated with a resist layer. The fine structure which makes up the diffraction grating 5 is then directly written into the resist with an electron beam or an ion beam.

Whichever way the mould is formed, the mould is then electroformed to form a hard master, which is a negative of the mould and therefore also a negative of the diffractive structure 100 to be produced. The material of the master needs to be hard enough to allow embossing of a plastics material or other material from which the diffractive structure 100 is formed. The master may be nickel or copper for example.

The master is then thermoformed to produce a negative replica of the master in a polymer, in the same way as a conventional commercial hologram. Suitable polymers include polymethyl methacrylate or polycarbonate. The facets 2 on the replica are then metallised with a thin layer of a metal such as chrome, copper, nickel or aluminium to produce the diffractive structure 100 of FIG. 1. The metallised layer may be 10 to 50 nm thick and is preferably discontinuous over the small scale relief that forms the diffraction grating 5 so that the diffraction grating 5 is partially absorbing or transmitting, and is only weakly specularly reflective.

Figure 2:
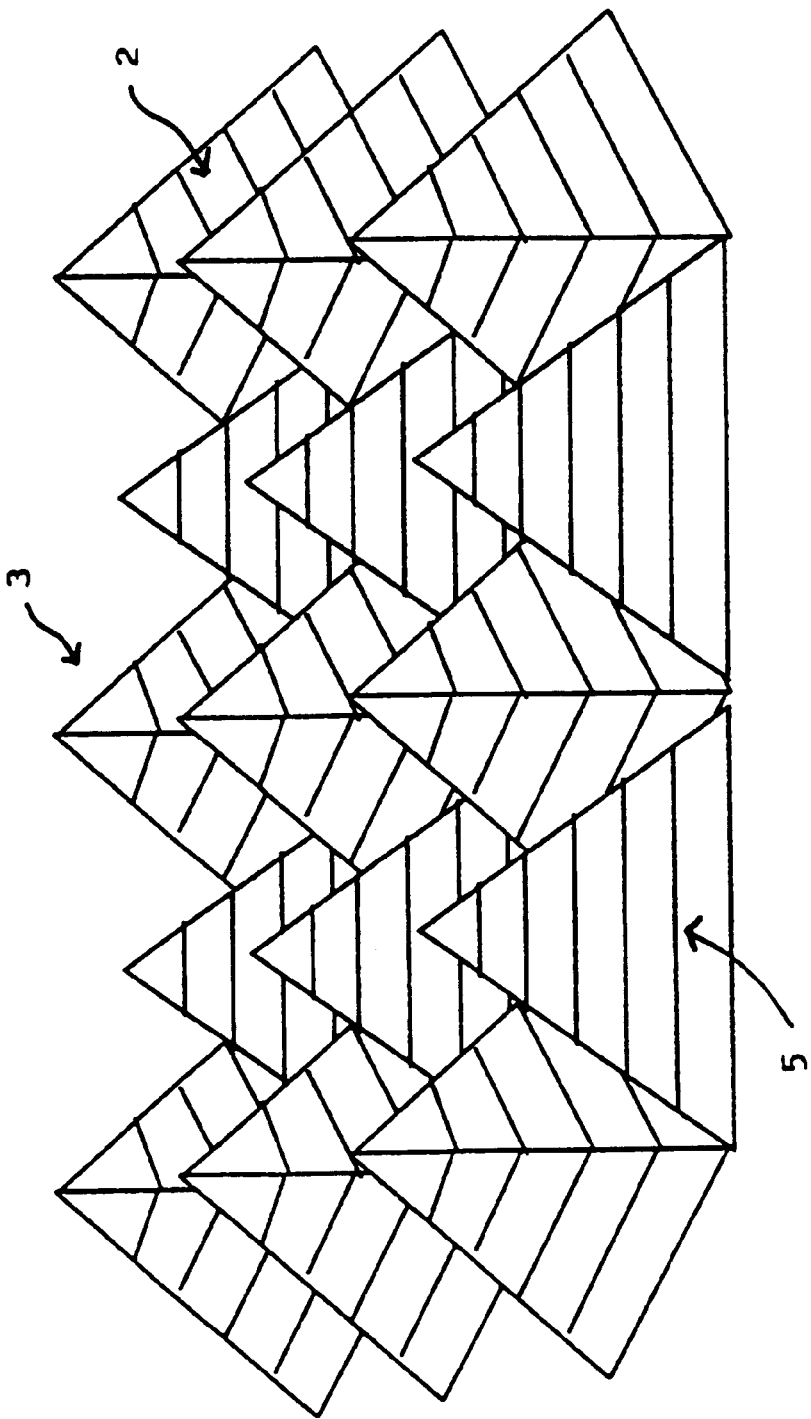
FIG. 2 is a schematic perspective view of another example of a diffractive structure according to the present invention.

The structure 100 is preferably then filled with a layer of material 7. The material of the layer 7 is transparent and may be a solvent-drying or chemically-curing polymer, such that the structure 100 has substantially flat and parallel outer surfaces, and the internal structure relief is filled with polymer 7, as shown in FIG. 2. The polymer layer 7 may conveniently be the adhesive which is used to fix the diffractive structure 1 to a substrate on which it is mounted.

Figure 5:
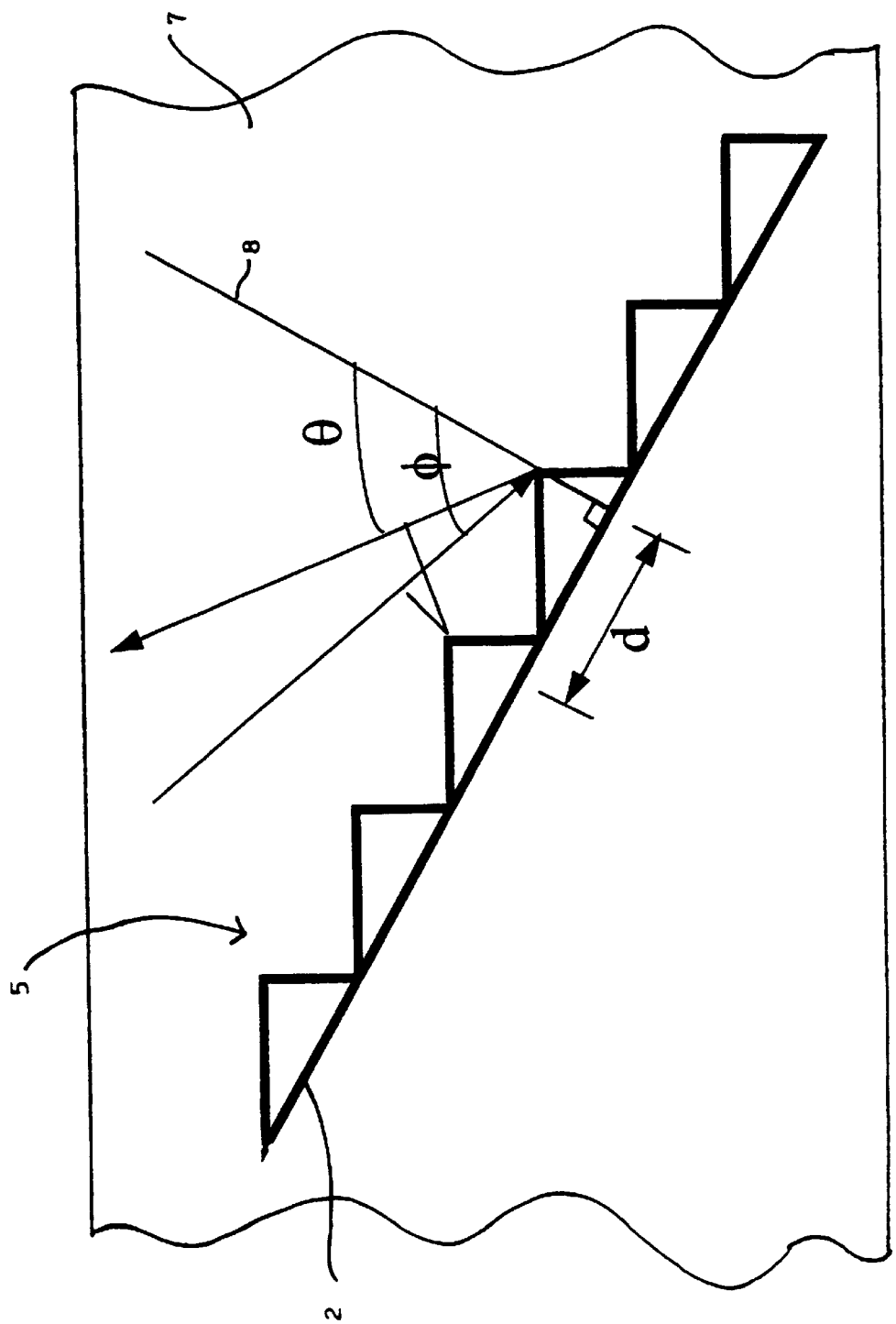
FIG. 5 is a drawing showing a representation of a light ray incident on the diffractive structure.

Light entering the polymer layer 7 is diffracted, absorbed, or reflected by the facets 2. Undiffracted light is either absorbed by the diffraction grating 5 or is specularly reflected. If it is specularly reflected, it passes to the neighbouring facet 2 where again it is absorbed or specularly reflected. If the diffraction grating 5 is designed such that only 10% of light falling upon it can be specularly reflected, only 1% may re-emerge after two such reflections. In the absence of diffraction, the whole structure 100 is therefore substantially non-reflective and appears to the viewer to be black. The diffraction grating 5 can be designed to reduce the amount of light which is specularly reflected by ensuring that the pitch of the grating is less than the wavelength of light incident on the grating and having the depth of the grating 5 such that the back reflection is cancelled by interference. If the surface of the grating 5 is coated as suggested above with a "lossy" metal (i.e. one with a low reflectivity such as copper, nickel or aluminium) or the metal is discontinuous across the lines 6 of the grating 5, then the incident light is absorbed rather than reflected. Diffraction will occur when the wavelength of incident light, the angle of incidence of the light, and the period of the diffraction grating 5 have the following relationship:

$$\lambda/\eta = d.\sin(\phi) + d.\sin(\theta)$$

where $\lambda$ is the wavelength of the light, $\eta$ is the refractive index of the polymer 7 filling the diffraction structure, $\phi$ and $\theta$ are the angles of incidence and diffraction, relative to the normal 8 to the facet 2, respectively, and d is the period of the diffraction grating 5, as shown in FIG. 5.

The perceived colour of the structure 100 can be calculated by tracing the paths of the rays which enter and leave the structure 100 by diffraction. FIGS. 6 to 10 show how the distribution of rays changes as the rays are first refracted at the polymer surface as they enter the polymer, then diffracted at the facet, and refracted again as the rays leave the polymer.

Figure 6:
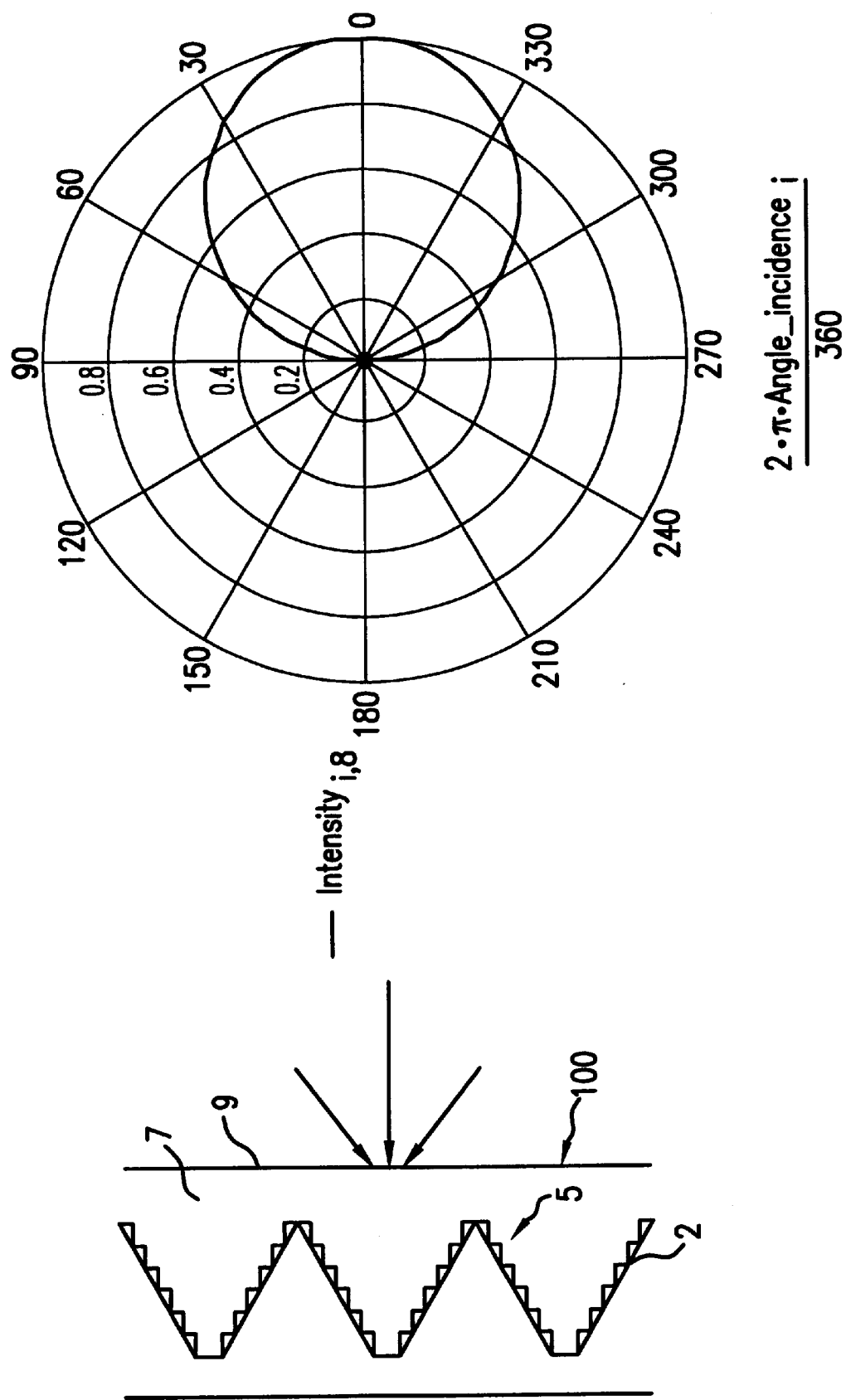
FIG. 6 shows the distribution of light rays incident on the surface of a polymer layer of the diffractive structure.

FIG. 6 shows a polar plot of the intensity incident on a surface under diffuse illumination, the surface in this case being the outer surface of the polymer layer 7. The intensity drops off with the cosine of the angle of incidence. This dependence is known as Lambertian illumination.

Because of refraction at the air-polymer boundary 9, the range of angles over which the light rays propagate within the polymer layer 7 is reduced, as shown in the polar plot of FIG. 7.

Figure 8:
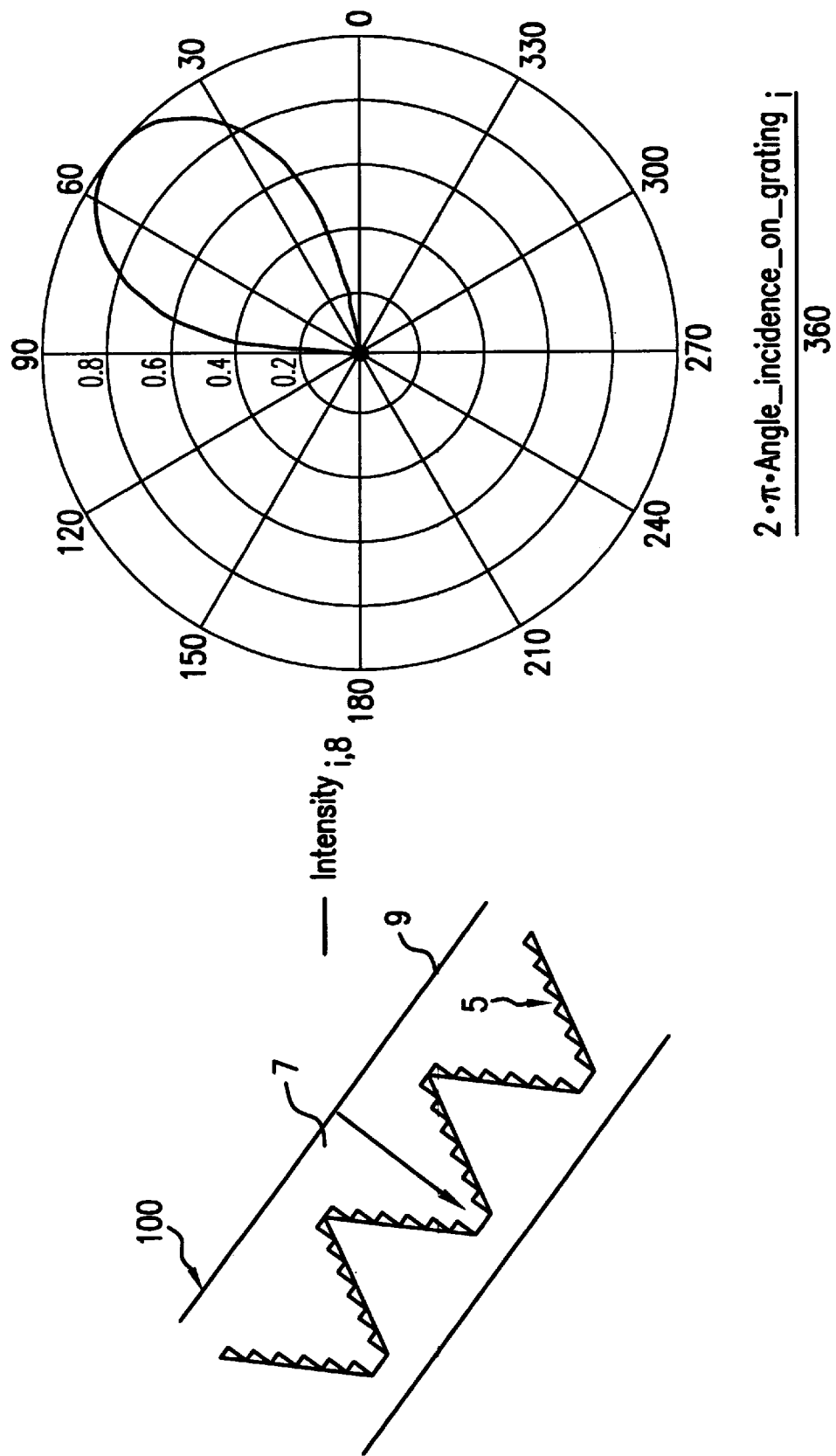
FIG. 8 shows the distribution of light rays incident on the grating of the diffractive structure.

As shown in FIG. 8, the rays then strike the diffractive grating 5 on the surface of the facets 2 at a range of angles and a proportion of the rays are diffracted. For the sake of reducing the complexity of this description, it is assumed that (i) where diffraction is possible, all of the light is diffracted, and (ii) where diffraction is not possible, the light is absorbed or transmitted by the diffractive grating 5 as described above. It is to be understood, however, that in practice the diffraction efficiency will vary with wavelength and angle.

Figure 9:
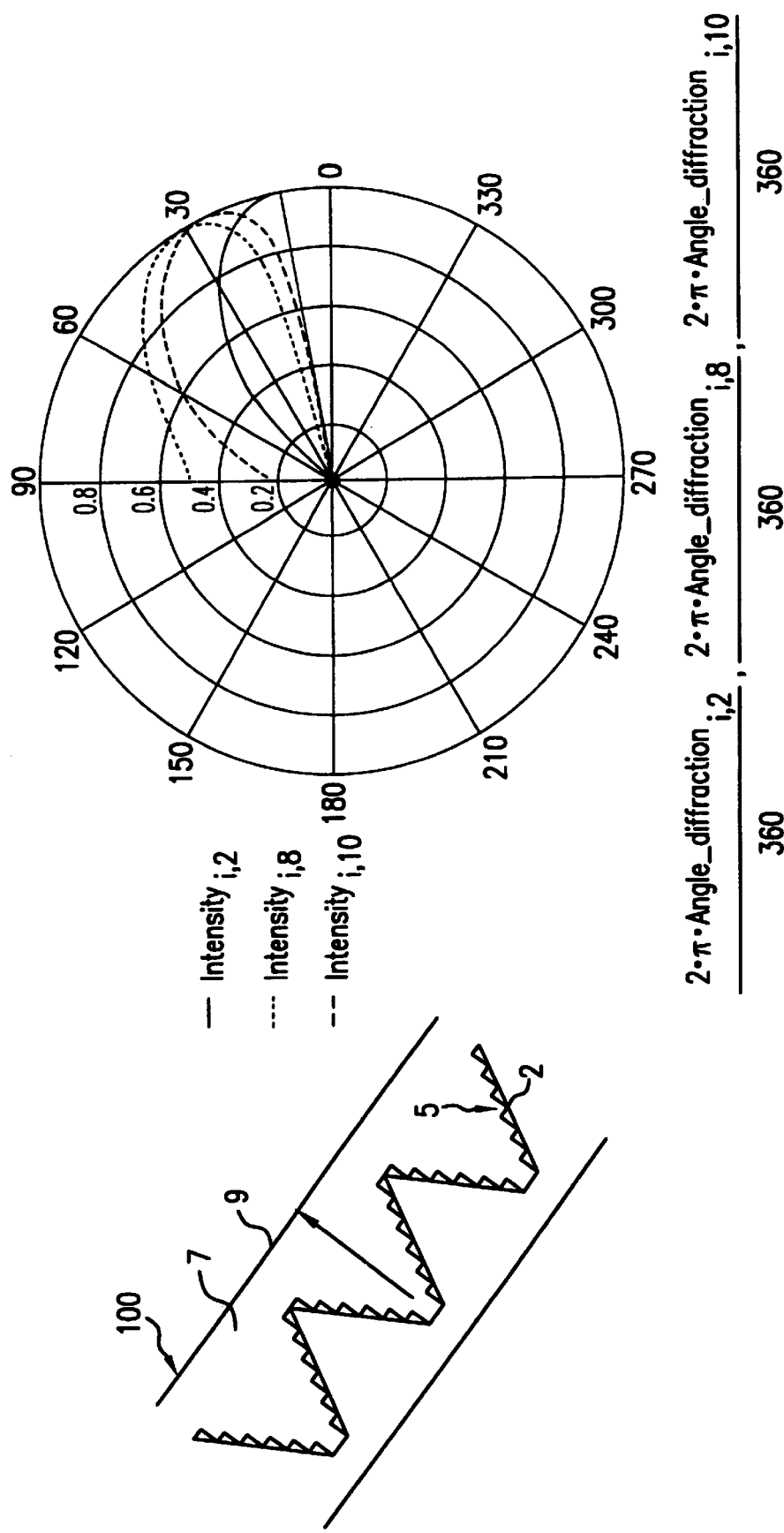
FIG. 9 shows the distribution of light rays diffracted from the grating of the diffractive structure.

Some of the light that is diffracted by the diffraction grating 5 on a particular facet 2 is shadowed by the neighbouring facet 2 and does not leave the diffractive structure 100. The polar plot of FIG. 9 shows the distribution of the diffracted rays from one facet 2 of the diffractive structure 100 for three different wavelengths. These wavelengths correspond to the peaks of the visual colour response. The solid line represents blue light, the dotted line represents green light and the dashed line represents red light.

Figure 10:
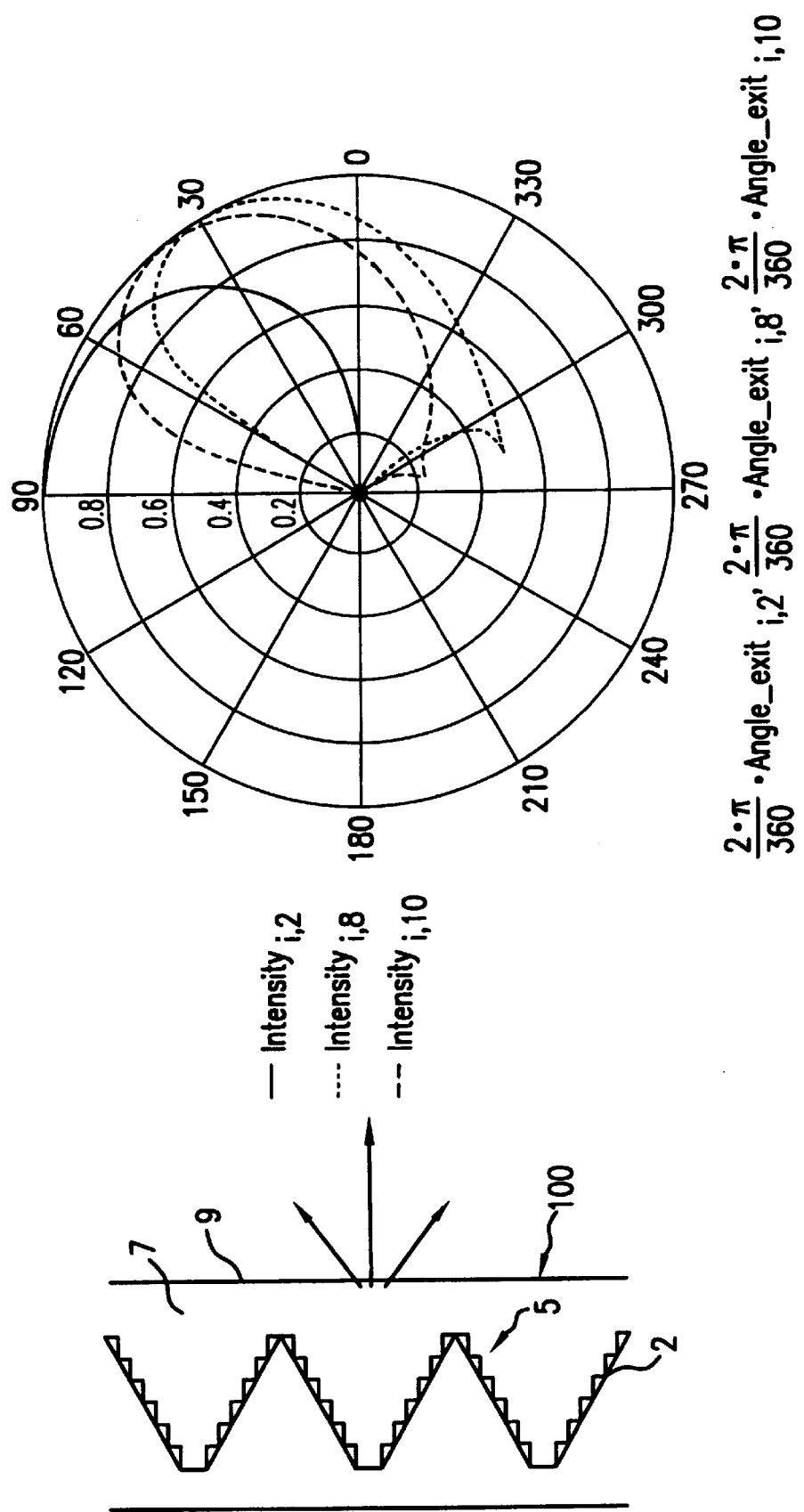
FIG. 10 shows the distribution of light rays leaving the diffractive structure; and, FIG. 11 is a CIE (Commission International de l'Eclairage) colour chart showing how the perceived colour varies with viewing angle.

As the rays leave the polymer layer 7, they are again refracted at the air-polymer boundary 9. FIG. 10 shows the distribution of rays that leave the diffractive structure 100 having been diffracted by one facet 2.

Figure 11:
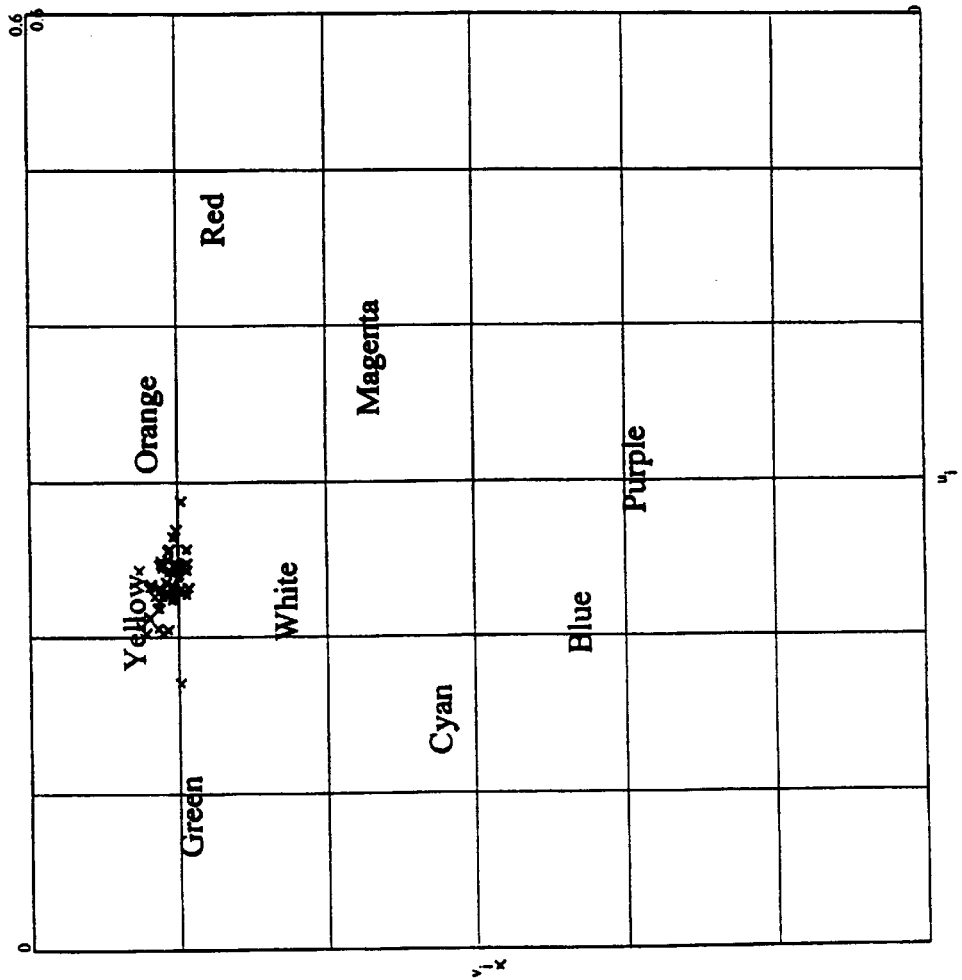

The light rays leaving the one facet 2 can be added to the rays from the neighbouring facet 2 to produce a plot on a standard CIE (Commission International de l'Eclairage) colour chart showing how the perceived colour varies with viewing angle. The chart is reproduced in FIG. 11. Over an 80° range of viewing angle (plus or minus 40° from the normal to the polymer layer surface 9), there is very little variation in perceived colour. In this case, the diffractive structure 100 produces a yellow colour under diffuse illumination. Different colours may be produced by altering the facet angles (i.e. the angle of a facet 2 to the polymer layer surface 9) and the period d of the diffraction grating 5.

Thus, the present invention provides a colour diffractive structure 100 which retains a saturated colour when viewed in diffuse lighting over a wide range of viewing angles.

The structure 100 can be mastered by conventional ruling techniques over a large area, and can be formed in a continuous polymer film by a single step embossing process similar to that used in the production of holograms.

The colour primarily depends on the facet angles and the pitch of the diffraction grating, neither of which change significantly during wear. The diffractive structure 100 is therefore ideal for production of large volumes of material. The diffractive structure 100 has particular application in security films on, for example, credit or debit cards where very many substantially identical diffractive structures 100 are required.

An embodiment of the present invention has been described with particular reference to the examples illustrated. However, it will be appreciated that variations and modifications may be made to the examples described within the scope of the present invention.

I claim:

1. A diffractive structure, the structure comprising:

a substantially planar substrate; and, a set of facets formed in or on said substrate, the facets lying in at least one plane, the at least one plane in which the facets lie being arranged at a non-zero angle to the plane of the substrate;

the facets having a diffraction grating formed thereon;

wherein the facets are provided by the faces of cubes.

2. A diffractive structure, the structure comprising:

a substantially planar substrate; and, a set of facets formed in or on said substrate, the facets lying in at least one plane, the at least one plane in which the facets lie being arranged at a non-zero angle to the plane of the substrate;

the facets having a diffraction grating formed thereon;

wherein the facets are provided by a corner cube structure.

3. A diffractive structure, the structure comprising:

a substantially planar substrate; and, a set of facets formed in or on said substrate, the facets lying in at least one plane, the at least one plane in which the facets lie being arranged at a non-zero angle to the plane of the substrate;

the facets having a diffraction grating formed thereon;

wherein the diffraction grating is provided by a crossed grating on the facets.

4. A diffractive structure, the structure comprising:

a substantially planar substrate; and, a set of facets formed in or on said substrate, the facets lying in at least one plane, the at least one plane in which the facets lie being arranged at a non-zero angle to the plane of the substrate;

the facets having a diffraction grating formed thereon;

wherein the facets are formed of a polymeric material coated with a layer of metal.

5. A structure according to claim 4, wherein the metal layer is discontinuous over the diffraction grating on the facets.

6. A method of manufacturing a diffractive structure the structure comprising: a substantially planar substrate; and, a set of facets formed in or on said substrate, the facets lying in at least one plane, the at least one plane in which the facets lie being arranged at a non-zero angle to the plane of the substrate; the facets having a diffraction grating formed thereon, the method comprising the steps of:

(A) producing a mould by machining a substrate with repeated passes of a cutting tool, the tool cutting the substrate deeper on each pass of the tool thereby to produce a cut face having machining lines;

(B) repeating step (A) to cut a further similar lined face opposite said first face thereby to produce a groove having machining lines on each opposed face;

(C) producing a master from said mould; and (D) producing the diffractive structure from said master, each facet having formed thereon a diffraction grating corresponding to the machining lines of the grooves in the mould.

7. A method according to claim 6, wherein further lined grooves parallel to the first lined groove are cut by repeating steps (A) and (B).

8. A method according to claim 6, wherein further lined grooves orthogonal to the first lined groove are cut by repeating steps (A) and (B).

9. A method according to claim 6, wherein further lined grooves parallel to the first lined groove are simultaneously cut with the first lined groove by a ganged series of cutting tools.

10. A method according to claim 6, wherein further lined grooves orthogonal to the first lined groove are simultaneously cut by a ganged series of cutting tools.

11. A method according to claim 6, wherein the master is produced by electroforming the mould.

12. A method according to claim 6, wherein the diffractive structure is produced by thermoforming the master.

13. A method according to claim 12, further comprising the step of coating the facets of the diffractive structure with a metal layer.

14. A method according to claim 13, wherein the metal layer is discontinuous over the diffraction grating on the facets.

15. A method of manufacturing a diffractive structure, the structure comprising: a substantially planar substrate; and, a set of facets formed in or on said substrate, the facets lying in at least one plane, the at least one plane in which the facets lie being arranged at a non-zero angle to the plane of the substrate; the facets having a diffraction grating formed thereon, the method comprising the steps of:

(A) producing a mould by anisotropic etching in a silicon substrate to produce a plurality of facets on the mould;

(B) coating the mould with a resist layer;

(C) writing the fine structure of the diffraction grating directly into the resist with at least one of an electron beam and an ion beam;

(D) producing a master from said mould; and, (E) producing the diffractive structure from said master.

* * * * *